United States Patent
Bolz

(10) Patent No.: US 9,727,392 B2
(45) Date of Patent: Aug. 8, 2017

(54) TECHNIQUES FOR RENDER PASS DEPENDENCIES IN AN API

(71) Applicant: NVIDIA Corporation, Santa Clara, CA (US)

(72) Inventor: Jeffrey Bolz, Cedar Park, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/856,468

(22) Filed: Sep. 16, 2015

(65) Prior Publication Data

US 2016/0077896 A1     Mar. 17, 2016

Related U.S. Application Data

(60) Provisional application No. 62/051,183, filed on Sep. 16, 2014.

(51) Int. Cl.
*G06F 13/00*     (2006.01)
*G06F 9/54*     (2006.01)

(52) U.S. Cl.
CPC ...................................... *G06F 9/54* (2013.01)

(58) Field of Classification Search
CPC ........ G06F 9/541; G06T 15/005; G06T 15/04
USPC .................................. 345/418, 582; 719/328
See application file for complete search history.

(56) References Cited

U.S. PATENT DOCUMENTS

| | | | |
|---|---|---|---|
| 2007/0030280 A1 | 2/2007 | Paltashev et al. | |
| 2014/0267259 A1* | 9/2014 | Frascati | G06T 15/005 345/423 |
| 2015/0187117 A1* | 7/2015 | Balci | G06T 15/005 345/522 |
| 2015/0302546 A1* | 10/2015 | Balci | G06T 1/20 345/522 |
| 2015/0379676 A1* | 12/2015 | Girado | G06T 1/20 345/501 |

FOREIGN PATENT DOCUMENTS

| | | |
|---|---|---|
| CN | 101072353 | 11/2007 |
| TW | 200703145 | 1/2007 |
| TW | 200821988 | 5/2008 |

* cited by examiner

*Primary Examiner* — Andy Ho

(57) ABSTRACT

Techniques for passing dependencies in an application programming interface API includes identifying a plurality of passes of execution commands. For each set of passes, wherein one pass is a destination pass and the other pass is a source pass to each other, one or more dependencies, of one or more dependency types, are determined between the execution commands of the destination pass and the source pass. Pass objects are then created for each identified pass, wherein each pass object records the execution commands and dependencies between the corresponding destination and source passes.

22 Claims, 2 Drawing Sheets

TECHNIQUES FOR RENDER PASS DEPENDENCIES IN AN API

CROSS-REFERENCE TO RELATED APPLICATIONS

This application claims the benefit of U.S. Provisional Patent Application No. 62/051,183 filed Sep. 16, 2014, which is incorporated herein in its entirety.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing systems is the application programming interface (API), which is a set of routines, protocols and tools that define functionalities that are independent of the respective implementation, for building applications, communicating between applications, and/or for accessing hardware resources of a computing system.

In conventional APIs, applications bind/attach resources like textures and rendertargets to a context. The driver tracks all these attachments in order to understand the dependencies and to insert wait for idle operations (WFIs), cache invalidations, and the like, as needed. The cost of tracking these attachments is one of the main central processing unit (CPU) bottlenecks in the system. In more recent APIs, there is a desire to eliminate the binding of resources. In bindless APIs, the application specifies "resource transitions" on objects when their usage changes, like switching from rendering to a texture, to texturing from it. This provides the same information as the bindings in older APIs, except as separate/explicit commands, rather than implicitly as a side effect of binding. This approach is function, albeit heavy-handed, for synchronization and cache control, but lacks tiling information and the like. It is also cumbersome for applications, which must sometimes apply transitions to hundreds of object to specify a single "dependency." The out of order nature of works specification vs work submission (via command buffer record/play) further complicates the conventional bindless systems. Accordingly, there is a continued need for improved bindless APIs.

SUMMARY OF THE INVENTION

The present technology may best be understood by referring to the following description and accompanying drawings that are used to illustrate embodiments of the present technology directed toward techniques for passing dependencies in APIs.

In one embodiment, the techniques include identifying a plurality of passes for received command. The received commands may comprise rendering commands for execution by one or more execution engines of a graphics processing unit (GPU). For each set of passes, wherein a first pass of the set is a destination pass and a second pass of the set is a source pass respectively, one or more dependencies between the commands of the destination pass and the source pass are determined. The determined dependencies may be of one or more dependency types including execution dependencies, cache dependencies, tiling dependencies, and the like. Pass objects are then created for each identified pass. Each pass object records the commands and dependencies between the corresponding destination and source passes. Thereafter, the commands of the plurality of pass objects are submitted for execution according to the corresponding pass objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
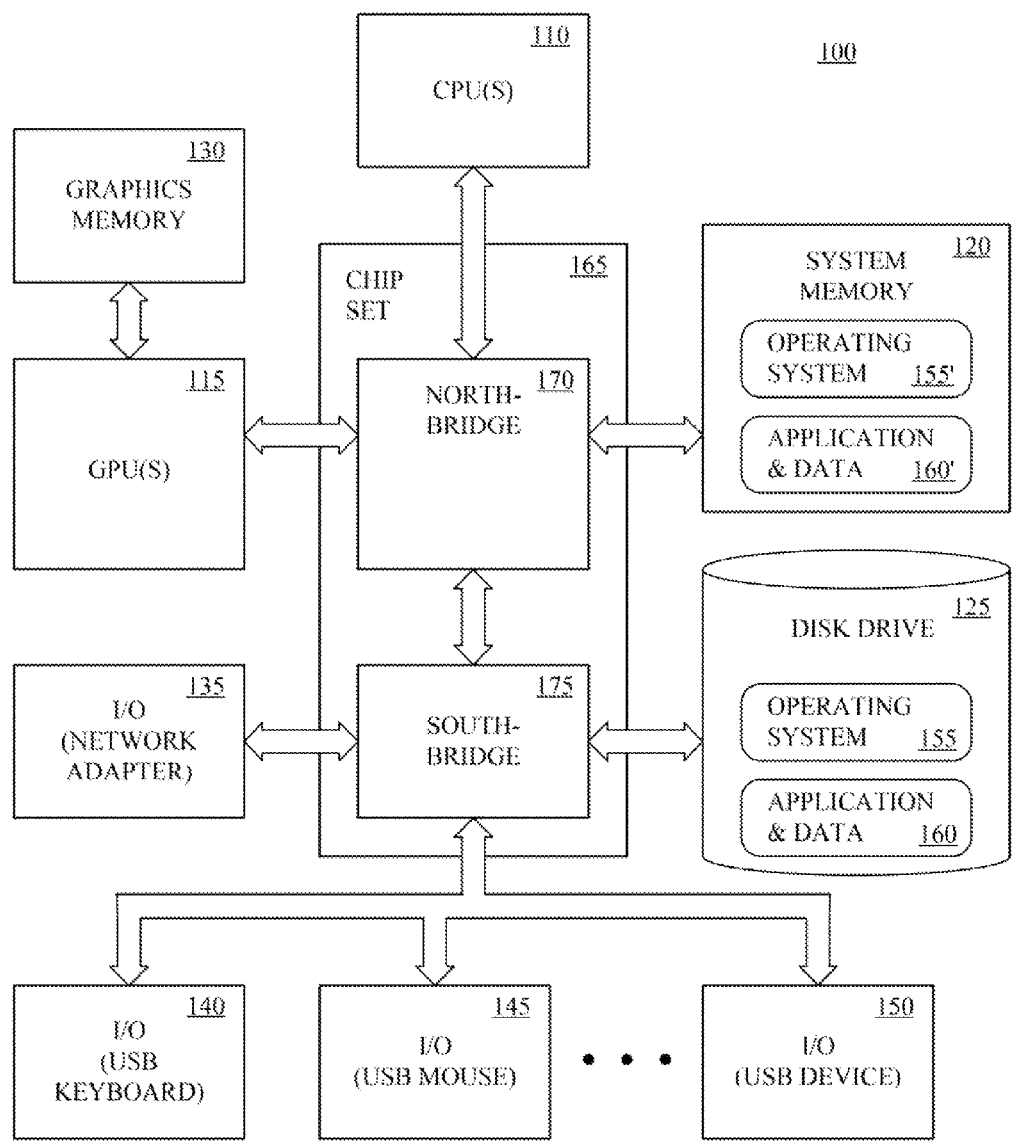
FIG. 1 shows a block diagram of an exemplary computing device for implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, an exemplary computing device for implementing embodiments of the present technology is shown. The computing device 100 may be a personal computer, laptop computer, tablet computer, smart phone, game console, server computer, client computer, distributed computer system, or the like. The computing device 100 includes one or more central processing units (CPU) 110, one or more specialized processing units such as graphics processing units (GPU) 115, one or more computing device-readable media 120, 125, 130 and one or more input/output (I/O) devices 135, 140, 145, 150. The I/O device 135, 140, 145, 150 may include a network adapter (e.g., Ethernet card), CD drive, DVD drive and/or the like, and peripherals such as a keyboard, a pointing device, a speaker, a printer, and/or the like.

The computing device-readable media 120, 125, 130 may be characterized as primary memory and secondary memory. Generally, the secondary memory, such as a magnetic and/or optical storage, provides for non-volatile storage of computer-readable instructions and data for use by the computing device 100. For instance, the disk drive 125 may store the operating system (OS) 155 and applications and data 160. The primary memory, such as the system memory 120 and/or graphics memory 130, provides for volatile storage of computer-readable instructions and data for use by the computing device 100. For instance, the system memory 120 may temporarily store a portion of the operating system 155' and a portion of one or more applications and associated data 160' that are currently used by the CPU 110, GPU 115, and the like.

The computing device-readable media 120, 125, 130, I/O devices 135, 140, 145, 150, and GPU 115 may be communicatively coupled to the processor 110 by a chip set 165 and one or more busses. The chipset 165 acts as a simple input/output hub for communicating data and instructions between the processor 110 and the computing device-readable media 120, 125, 130, I/O devices 135, 140, 145, 150, and GPU 115. In one implementation, the chipset 165 includes a northbridge 170 and southbridge 175. The northbridge 170 provides for communication with the processor 110 and interaction with the system memory 115. The southbridge 175 provides for input/output functions.

A common aspect of operation of the software running on the hardware of the computing device 100 are application programming interfaces (API). During execution of commands there is a large number of dependencies that control the proper execution of applications. The API needs to provide a mechanism to pass information about the dependencies for execution of the commands.

Figure 2:
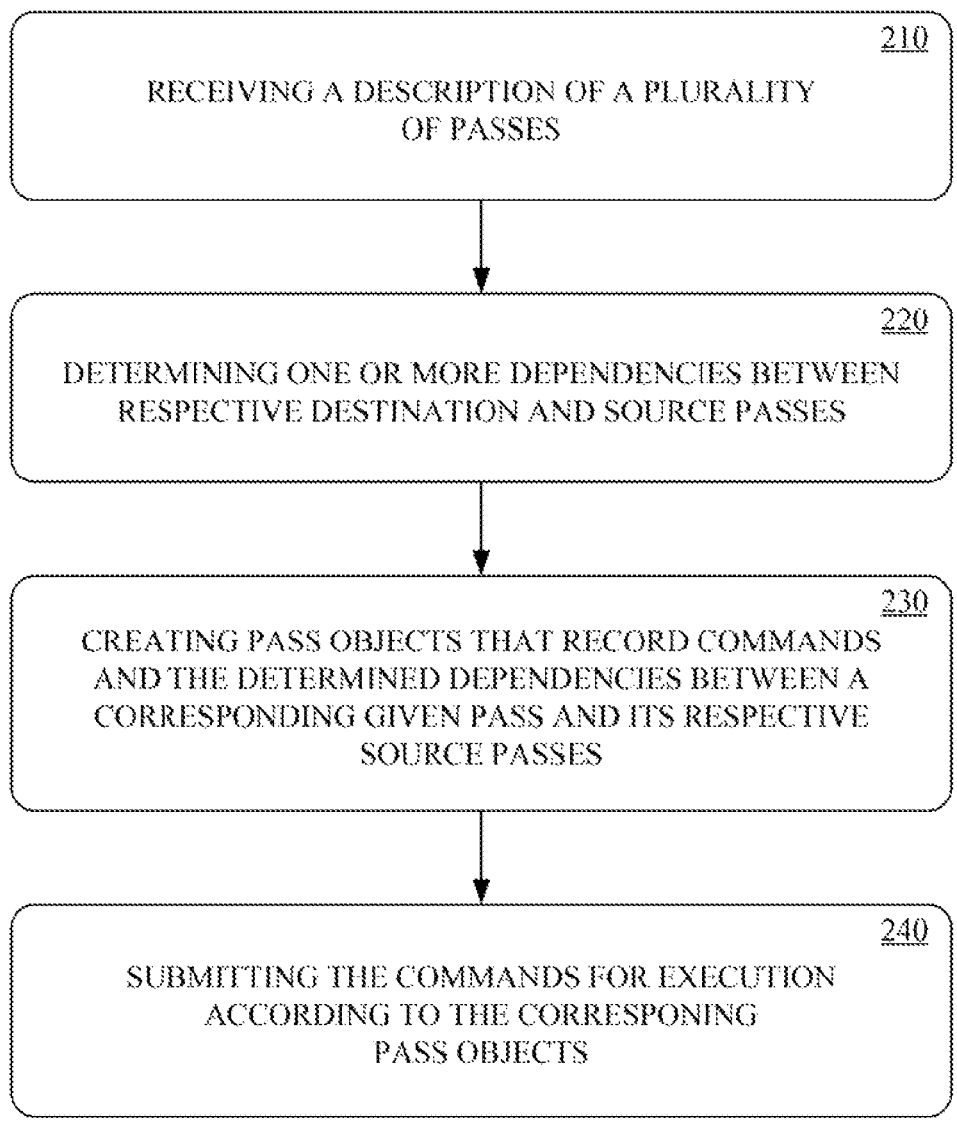
FIG. 2 shows a flow diagram of a method of passing dependencies in an application programming interface (API), in accordance with embodiments of the present technology.

Referring now to FIG. 2, a method of passing dependencies in an application programming interface (API), in accordance with embodiments of the present technology, is shown. The method may be implemented as computing device-executable instructions (e.g., computer program) that are stored in computing device-readable media (e.g., computer memory) and executed by a computing device (e.g., processor).

The method begins with receiving a description of a plurality of passes, at 210. At 220, for each set of passes, wherein one pass is the destination pass and the other pass is the source pass relative to each other, one or more dependencies of one or more dependency types are determined between the given destination pass and its respective source pass. The dependency types may include execution dependencies, cache dependencies, tiling dependencies, and the like. The dependencies may be specified by a source mask, destination mask, flush mask, invalidate mask, and the like. At 230, pass objects are created, wherein the pass objects records the commands and the determined dependencies between a corresponding given pass and its respective source passes. The commands, in one implementation, comprise rendering commands for execution by one or more execution units of one or more graphics processing units and or central processing units. At 240, the commands are submitted for execution according to the corresponding pass objects.

In another embodiment, the method begins with receiving execution commands. The execution commands, in one implementation, comprise rendering commands for execution by one or more execution units of one or more graphics processing units and or central processing units. A plurality of passes are identified for the received execution commands. For each set of passes, wherein one pass is the destination pass and the other pass is the source pass relative to each other, one or more dependencies of one or more dependency types are determined between the given destination pass and its respective source pass. The dependency types may again include execution dependencies, cache dependencies, tiling dependencies, and the like. A pass object is created for each identified pass. The pass objects records the execution commands, and dependencies between the corresponding given pass and its respective source passes. The dependencies may again be specified by a source mask, destination mask, flush mask, invalidate mask, and the like. The rendering commands for the pass objects are submitted for execution according to the corresponding pass objects.

A pass includes the state of the rendertarget(s), which includes the image memory that results are written to, and the render commands that generate the image content. The dependencies between the passes is how the API expresses what needs to finish in the source dependency before work begins in the pass that is the destination of the dependencies.

In one example, a first pass (source) may be rendering a texture to its rendertarget, while a second pass (destination) is texturing in a fragment shader from the texture as it writes to its own rendertarget. The dependencies would therefore specify that the source pass needs to complete all of its rendertarget writes before the destination pass starts its fragment shading. Additionally, a dependency, in one implementation, specified in one or more flush masks, indicates that if write backs are used in the source pass then the data needs to be flushed to memory. Similarly, a dependency, in one implementation, specified in one or more invalidation masks, indicates that if one or more caches are used for reads in the destination pass, the cache needs to be invalidated.

Rendering passes may operate on image data of for example 1000×1000 pixels. The data may be split into small tiles of say 100×100 pixels, for example. In such case it is desirable to group the draw commands for a given tile in the command buffer, so that the data can be cached locally to the processing engine, to reduce or eliminate writes and/or reads to memory for respective source and destination passes. If the nature of the dependency is such that each pixel in the second pass depends only upon a corresponding pixel at the same location in the first pass, the edge between the two passes is considered not to be a tiling boundary and the two passes are considered tileable. Therefore, relevant commands can be issued and executed in a per tile order, and the dependencies between the passes indicate that they are tileable.

Based upon the above described method, the dependency information can be categorized into three concepts: execution dependencies, cache dependencies, and tiling dependencies. None of the dependency concepts require per-resource state tracking. The pass objects and dependencies can be conceptualized as a directed acyclic graph (DAG). The pass objects and dependencies form a partial order such that a collection of commands must be performed in an ordered sequence. While unrelated passes can advantageously continue to execute while dependencies between other passes are processed.

In accordance with embodiments of the present technology, rendering passes are encapsulated in pass objects. Pass objects specify their dependencies on other passes, and part of specifying that dependency is to specify execution and cache dependencies on the dependent passes. In one implementation, the execution and cache dependencies use a novel extension of the glMemoryBarrier command, including a more holistic cache model. The pass object also serves as a place to collect information about tiled caching interactions with previous passes, specifically to enable multi-pass tiled caching as well as tiled caching of a mixture of graphics and compute work.

A major design difference between embodiments of the present technology and earlier APIs, like OpenGL, is that embodiments of the present technology, herein after referred to as RAD, requires more explicit application control of hazards and dependencies between rendering passes. As a primary goal of the API is to provide state and binding changes directly to the GPU without CPU/driver intervention, there is no longer a central arbiter with knowledge of how resources have been used and when that usage changes, so RAD must rely on the application providing that information in some form. In particular, the major functions that must be replaced include:

Execution dependencies: Understanding what work must complete before later work may begin;

Cache flushing and invalidation: Ensuring that non-coherent caches are flushed or invalidated when new data is written to a resource;

Decompression: Resolving a compressed surface to be uncompressed if it will be accessed by a hardware unit that does not support compression; and Tiling: Expressing dependencies between rendering passes in a way that allows one or more passes to be replayed per-tile to optimize off-chip memory bandwidth.

These three functions are very often needed at the same times during a rendering algorithm and require similar information, so there is significant overlap in the operations used to provide this information to the driver.

Consider a simple example—rendering to a texture and then texturing from it in a fragment shader. The execution dependency is that the rendertarget writes in the first pass must complete before launching future fragment work. If rendertarget writes are writeback cached, such a cache must be flushed, and if data from the rendertarget had previously been cached in a texture cache, such a cache must be invalidated. If the texture unit does not support accessing this rendertarget compressed, it must be decompressed. Finally, the driver needs to know whether the second rendering pass may be executed per-tile along with the first pass, which depends upon which texels of the rendertarget are read by which pixels of the second pass.

Of these four functions, decompression operates on a specific object, so it is handled differently than the rest. When a texture is created, the application specifies what access types it will be used with via the command radTextureAccess (documented earlier). This allows the driver to allocate the memory with compression resources if any access types would benefit from compression. An application may also opt in to explicit control of decompression by calling the following command before storage is allocated, with <enable>=RAD_TRUE:

void radTextureCompressionControl(RADtexture texture, RADboolean enable);

After the storage is allocated, the application can then query whether the format and type of the texture require manual decompression when used by specific access types. If a texture has compression control enabled, then the application is responsible for decompressing the memory as needed using the command:

void radDecompressTexture(RADtexture texture, RADuint level,

RADuint xoffset, RADuint yoffset, RADuint zoffset,

RADsizei width, RADsizei height, RADsizei depth);

If a texture has compression control disabled, the driver automatically decompresses the memory each time it is unbound as a rendertarget. (Note: This assumes that rendering is the primary way that memory becomes compressed. If this is not the case, the driver may require manual explicit decompression control in order to allocate compression for a texture).

Before defining a cache invalidation interface, it is important to have a model defining the cache hierarchy against which any interface can be evaluated.

Each access type may have a non-coherent and possibly distributed L1 cache (distributed in order to be closer to the shader or other processing engine). If the access type is read-only (texture, uniform buffer) then the cache is read-only. If the access type is writeable (SSBO, image, rendertarget), the cache may be writeback or writethrough. Multiple access types may share a single cache on some implementations. Given the locality to a processor, L1 caches might only be invalidateable by the queue that produced the cache entries.

All GPU accesses may share a coherent L2 cache. This cache, if it exists, must be coherent between all GPU accesses, but need not be coherent between CPU and GPU. Coherent" in this case means that writes from any GPU accesses on any unit of the GPU will be seen by any other GPU accesses on any unit of the GPU, assuming that the write has made it to the L2 cache and that the read does not hit a stale L1 cache entry. If an implementation does not have an L2 cache, then GPU memory must have this same coherent behavior. The L2 cache may be either writeback or writethrough.

A FenceSync command causes any writeback L1 caches relevant to the queue it is submitted on to be written through ta the coherent L2 before it signals completion.

There are a few classes of memory "clients" that all read and write memory, and the following cache invalidation rules define what operations are required to make these writes and reads effectively coherent with each other. Clients include the CPU, the set of GPU Copy commands, and the set of GPU accesses via GPU handles (all access types).

CPU writes that occur before commands are submitted to a queue will automatically be visible to those subsequent commands on that queue, with no additional information provided by the application. One viable driver implementation of this requirement is to invalidate any CPU-accessible lines of all L1 caches and the L2 cache each time a batch of work is submitted (or "flushed") to a queue. While this may sound heavy-handed, flushes are usually infrequent and the portion of the caches used by CPU-accessible lines is usually small.

For CPU reads to see the result of GPU writes, either via Copy commands or GPU handles, those writes must be flushed out of any writeback L1 or L2 caches and then the CPU must wait for the writes to complete. This can be accomplished by using the appropriate flag in the FenceSync command.

If both the CPU and GPU write to the same memory without sufficient synchronization of execution and cache flushing, the above rules do not apply and the result is undefined.

GPU Copy commands are intended to be "streaming" operations and therefore do not use a persistent L1 cache. They more commonly have simple line buffering to coalesce reads and writes which are immediately flushed after use. Specifically, their reads will always access current data from L2 and writes will write through to L2. As such, they do not have caches of their own that require invalidation, but their writes can make lines in other access types' L1 caches stale.

Copy commands cause other units' L1 caches to be invalidated in a semiautomatic manner. The application is only responsible for expressing *execution dependencies* between copy queues and other queues via sync objects, and rules based on these execution dependencies provide the driver with information needed to invalidate the appropriate caches. Further, the driver knows what access types are enabled for the destination memory of the copy, which allows it to further limit which caches are invalidated.

The fundamental rule is that for Copy commands on a copy queue to have well-defined behavior, there must be:
a FenceSync(OtherQ)→QueueWaitSync(CopyQ) dependency from any queues that may have old cached values, where the FenceSync is after the last read/write of the memory and the QueueWaitSync is before the Copy. And,
a FenceSync(CopyQ)→QueueWaitSync(OtherQ) dependency after the Copy and before any subsequent reads/writes of the memory on the other queue.

There are multiple possible implementations of this semi-automatic cache invalidation behavior. First, if a copy queue is capable of invalidating other queues' L1 caches, it may do so immediately or at the next FenceSync command, trivially satisfying this requirement.

A second possible implementation is to perform cache invalidations at QueueWaitSync time, using information provided by the queue that is the source of the sync object. This allows invalidations to be deferred to the queue that can invalidate its own caches.

If GPU memory is freed and recycled/reallocated, the driver is responsible to guarantee that there are no stale cache lines for that memory before the memory is reallocated.

The remaining clients are reads and writes through any of the access types that use GPU handles. It is the application's responsibility to flush and invalidate these caches when there is a dependency, using a "barrier". The specific API for a barrier is described in the following section, but conceptually the barrier has four pieces of state:
srcMask, dstMask: Bitfields of pipeline stages
flushMask, invalidateMask: Bitfields of access types A barrier provides information about execution barriers and cache flushing and invalidation. <srcMask> and <dstMask> indicate the source and destination of the execution dependency, i.e. any work on the pipeline stages indicated by <dstMask> may not begin until all prior work on the pipeline stages indicated by <srcMask> have completed. <flushMask> and <invalidateMask> indicate which access types' caches need to be written back (flushed to L2) or invalidated (discarded), respectively. The cache flush and/or invalidate occur after the work indicated by <srcMask> finishes and before the work indicated by <dstMask> begins.

Tying this back to our earlier simple render-to-texture example, the operation would be responsible for inserting a barrier between the render and texture passes, with parameters:
srcMask=RAD_RENDERTARGET_STAGE_BIT
dstMask=RAD_FRAGMENT_STAGE_BIT
flushMask RAD_RENDERTARGET_ACCESS_BIT
invalidateMask=RAD_TEXTURE_ACCESS_BIT A rendering algorithm generally consists of a set of "passes", where each pass generates one rendertarget as an output (or multiple rendertargets, aka "MRT", generated collectively). Using the simple render-to-texture example, rendering to the texture is the first pass, and rendering to the second rendertarget while texturing from the texture is the second pass.

The true dependencies between these passes form a directed acyclic graph (DAG), yet conventional graphics APIs only express a linear sequence of commands, effectively representing a "flattened" form of the DAG. Those APIs also rely on strict ordering of commands to guarantee that a dependent pass is complete before a subsequent pass begins. In a modern API like RAD where the driver does not inspect binding information, the driver is unable to reverse engineer the true dependencies, and thus it is important for the application to provide this information explicitly.

A "pass" object represents a node in the DAG, and includes dependency information which represent the edges in the DAG. The pass includes information about inputs (dependencies, barriers, preserved buffers), outputs (rendertargets, discarded buffers, resolved buffers), and tiling state (1:1 pixel mapping, filter width, memory footprint). The tiling state provides enough information for an implementation to support multipass tiling, i.e. rendering more than one pass before moving to the next tile in the rendertargets.

More exhaustively, the state includes:
Rendertarget attachments: color, depth, and stencil buffers where the results of the pass are written. Initial state is no attachments.
void radPassRenderTargets(RADpass pass, RADuint numColors,
const RADrenderTargetHandle*colors.

RADrenderTargetHandle depth,
RADrenderTargetHandle stencil);

Preserved buffers: which of the color, depth, and stencil attachments have their contents preserved at the start of the pass. If the contents of an attachment are not preserved, then relying on those contents produces undefined behavior. Initial state is all attachments preserved.
  void radPassPreserve(RADpass pass, RADattachment attachment,
    RADboolean enable);

Discarded buffers: which textures have their contents discarded at the end of the pass. This command takes texture CPU handles rather than attachment enums, because a buffer that needs to be discarded may have been a rendertarget in a previous pass and not in the current pass. This command also accepts a "pixel offset" applied to each discard, which is described later in the context of multipass tiling. Initial state is no textures discarded.
  void radPassDiscard(RADpass pass, RADuint numTextures,
    const RADtexture*textures,
    const RADoffset2D*offsets);

Resolved buffers: which multisample color attachments are resolved to a non-multisample color buffer at the end of the pass. If such a multisample buffer is also flagged to be discarded, then the resolve occurs immediately before the discard. Initial state is no attachments resolved.
  void radPassResolve(RADpass pass, RADattachmecnt attachment,
    RADtexture resolved);

Stored buffers: which textures should have their contents flushed to memory at the end of the pass. "Storing" is a hint that the texture should be flushed from the tile memory to off-chip memory, because its contents are not needed for the remainder of a multipass tiling sequence. Not marking a texture to be stored does not imply that it is discarded, the contents will be preserved, however not storing a buffer at the appropriate time may keep it in tile memory longer than needed. Storing also involves a pixel offset, for reasons similar to discarding. Initial state is no textures stored.
  void radPassStore(RADpass pass, RADuint numTextures,
    const RADtexture*textures,
    const RADoffset2D)*offsets);

Clip rectangle: A two-dimensional region of the rendertargets that acts as a scissor to all operations in the pass, including rendering, discards, and resolves. Initial state is unclipped, i.e. (x,y)=(0,0), (width,height)=(max,max).
  void radPassClip(RADpass pass, RADuint x, RADuint y,
    RADuint width, RADuint height);

Dependent passes: A list of passes which this pass depends on. The implementation must guarantee those passes have completed to a level described by the barrier. Initial state is no dependencies.
  void radPassDependencies(RADpass pass, RADuint numPasses,
    const RADpass*otherPasses);

Barrier: A description of the stages and caches involved in the dependency between the previous passes and the current pass. As described in the Barrier section, work in the dependent passes must complete as far as <srcMask> and be flushed from caches according to <flushMask> and invalidated according to <invalidateMask>, before work in the current pass may proceed as far as <dstMask>. Initial state is no barrier. In another embodiment, the barrier state is specified once for each dependency rather than once per pass.
  void radPassBarrier(RADpass pass, RADbitfield srcMask, RADbitfield dstMask,
    RADbitfield flushMask, RADbitfield invalidateMask);

Tiling boundary: A boolean indicating whether it is safe to execute this pass per-tile along with its dependencies. If this is true (indicating this is a boundary), the tiler must be flushed before beginning this pass. An application can set this to false if there is a screen-space correlation between fragment threads in the current pass and which texels of the prior rendertargets are fetched by those fragment threads. Normally this must be a 1:1 mapping, but the API also allows for a non-zero "filter width". Initial state is boundary=TRUE. In another embodiment, the boundary state is specified one for each dependency rather than once per pass.
  void radPassTilingBoundary(RADpass pass. RADboolean boundary);

Tiling filter width: The API accommodates multipass tiling where the second pass does not have an exact 1:1 relationship between source texture coordinates and fragment thread window coordinates. If the application can guarantee that the texture coordinates are within +/−[filterWidth, filterHeight] of the window coordinate, it can enable multipass tiling (i.e. boundary=FALSE) across such a dependency. Initial state is filterWidth=filterHeight=0.
  void radPassTileFilterWidth(RADpass pass,
    RADuint filterWidth, RADuint filterHeight);

In another embodiment, the filter width and filter height state are specified once for each dependency rather than once per pass.

Tile footprint: For multipass tiling, the implementation may need to know up front how much memory will be used by a tile such that it can choose the most efficient tile size. The memory footprint depends on the "working set" size of each pixel, i.e. the total bytes per pixel active at any time during the multipass. The footprint also depends on the maximum filter width, which affects how many pixels must be kept alive at any time. Initial state is bytesPerPixel=maxFilterWidth=0.
  void radPassTileFootprint(RADpass pass, RADuint bytesPerPixel,
    RADuint maxFilterWidth);

The bytes per pixel may need to be made more precise by involving antialiasing modes.

A pass's lifetime is managed with the usual commands (radCreatePass, radReferencePass, radReleasePass), and is made immutable by radCompilePass. Compiling a pass does not involve associating rendering commands with it, it means that the pass may subsequently be used to submit rendering commands.

Before digging into pass behavior, it is important to understand the models of tiling hardware and how they interact with multiple passes. There are two main classes of tiler behavior:

(1) Explicitly managed tile memory. This class of hardware requires explicitly loading off-chip memory into on-chip tile memory at the start of each pass, and conversely storing tile memory to off-chip memory at the end of each pass. With the exception of some simple cases like a multisample resolve, explicitly managed hardware is generally not amenable to multipass tiling and may effectively insert a boundary between every pass. Multipass tiling would require partitioning the tile memory by render targets in potentially complex ways, and making texture requests be able to target the portions of tile memory. If the application requests multipass tiling, it likely falls back to single-pass.

(2) Unified cache-based tile memory. This class of hardware has tile memory act as a cache, with lines loaded from memory on-demand and evicted to memory on an as-needed basis. Further, this cache also serves other memory access types like texture, so it is possible to effectively texture from the tile memory. This may be the same L2 cache as described earlier. This style of hardware is more amenable to multipass tiling and is the main target of the multipass design.

Some of the pass state may have different internal behavior depending on the class of tiling hardware:

"Preserve": On explicitly managed hardware, this requires a load/copy from off-chip memory to tile memory. On cache-based hardware, this may be a nop.

"Discard": On explicitly managed hardware, a discarded buffer implies skipping a store/copy from tile memory to off-chip memory. On cache-based hardware, this may invalidate lines of the cache without flushing the dirty lines to off-chip memory. When an attachment is NOT discarded, explicitly managed hardware will store/copy the memory at the end of a pass, and cache based hardware may do nothing. Cache-based hardware can also discard/invalidate memory during a subsequent pass of a multipass sequence.

"Store": On explicitly managed hardware, this may be a nop since the data is either already in off-chip memory due to a previous pass, or will be copied to memory at the end of the current pass. On cache-based hardware, this may flush a portion of the writeback cache memory.

"Clip rectangle": On explicitly managed hardware, this rectangle defines the regions that loads and stores apply to. On cache-based hardware, this may only act as a scissor for rendering commands.

"Tile footprint": On explicitly managed hardware, this may be ignored and the tile size chosen based solely on the rendertargets. On cache-based hardware, this footprint may be used to compute the desired tilesize for a multipass sequence.

On cache-based hardware, multipass tiling is fairly straightforward assuming there is an exact 1:1 mapping of texel coordinates read from an earlier pass to fragment coordinates in the current pass. The application can indicate this by setting boundary==FALSE and filterWidth/Height==0. When this is the case, the implementation can choose a tile size such that the entire working set of passes in the multipass can lit in the cache memory by using the bytesPerPixel of the tile footprint state. The implementation must still respect the barrier state on a per-tile basis, but all the relevant passes' tiles can fit in the cache memory and discard and store commands can operate as normal.

Multipass tiling is still possible, albeit more complex, when the mapping of texel coordinates to window positions is not exactly 1:1. RAD supports such multipass tiling when the application can guarantee that the texel coordinates are within a predetermined "filterWidth" of the window coordinates, specified via the radPassTileFilterWidth command. The implementation can use this to adjust the tile rectangle between passes by (filterWidth, filterHeight) pixels toward the origin such that a border of valid contents from the previous pass is available around the far two edges of the tile. Similarly, the application is responsible to provide accurate pixel offsets for Discard and Store commands. These commands are also offset toward the origin, and by offsetting them by double the filterWidth a valid region remains around the near two edges of the tile.

These extra strips of valid memory around the current and recent tiles are why an application should strive to provide an accurate maxFilterWidth, since the implementation will attempt to reserve cache space to keep this memory in the cache.

Unlike other APIs where compute commands can be freely interleaved with graphics commands and those commands are implicitly ordered, the RAD API requires compute commands to be in separate compute-specific passes (or run asynchronously on other compute queues). Compute passes can also be tiled with rendering passes; when there is a relationship between texture coordinates and compute shader invocation IDs. A compute pass can specify the nature of this relationship, which may be one pixel per compute invocation or N×M pixels per compute invocation. Tiling across such a pass is possible if the compute invocations fit naturally in the tile shape chosen for rendering. The application can specify the shape of a compute work group in pixels using the command radPassTileComputeFootprint.

In addition to specifying dependencies via multiple passes, it Is also possible to define dependencies within a pass using the command:

radQueuePassBarrier(RADqueue queue, RADbitfield srcMask, RADbitfield dstMask,
RADbitfield flushMask, RADbitfield invalidateMask);

This can be thought of as splitting the current node into two nodes, with the second node depending on the first according to the specified barrier. This can be useful in the sort of situations where MemoryBarrier or TextureBarrier were useful in OpenGL.

Work for a pass is submitted to a queue using the commands:

```
void radQueueBeginPass(RADqueue queue, RADpass pass);
// submit work to the queue between begin/end
void radQueueEndPass(RADqueue queue);
```

It is illegal to submit Copy or FenceSync commands during a pass, or to submit compute dispatch commands during a graphics pass. These commands must either occur outside a pass (in which case they will be assumed to depend on all passes submitted before them), or Copy and compute commands may be submitted to different (asynchronous) queues.

Some examples of how to use passes:

Single pass, no dependencies, discard depth at the end:

```
poss0 = radCreatePass(device);
// Set color and depth buffers
radPassRendertargets(pass0, 1, &color0, depth, 0);
// Depth buffer is to be discarded at the end, with no offset
radPassDiscard(pass0, depth CPU handle, /*offset*/{0,0});
// Finalize the pass object
radCompilePass(pass0);
// Use the pass
radQueueBeginPass(queue, pass0);
// Submit work
radQueueEndPass(queue);
```

Single pass, downsample, then discard:

```
pass0 = radCreatePass(device);
// Set multisample color buffer
radPassRendertargets(pass0, 1, &colorMS, 0, 0);
// Prior contents of the multisample buffer will not be preserved
radPassPreserve(pass0, color attachment 0, RAD_FALSE);
// Multisample data will be discarded at the end of the pass
```

-continued

```
radPassDiscard(pass0, colorMS, /*offset*/{0,0});
// The multisample data will be resolved to the color1X buffer before
// it is discarded.
radPassResolve(pass0, color attachment 0, color1X);
radCompilePass(pass0);
radQueueBeginPass(queue, pass0);
//submit work
radQueueEndPass(queue);
```

Render to two textures, then use them with a 1:1 texel: pixel mapping:

```
// Pass 0 renders to one of the textures (color0)
pass0 = radCreatePass(device);
radPassRendertargets(pass0, 1, &color0, 0, 0);
radPassTileFootprint(pass0, 12 bytes per pixel, 0 pixel max filter
width);
radCompilePass(pass0);
// submit work to pass0, repeat for pass1
pass2 = radCreatePass(device);
radPassRendertargets(pass2, 1, &color2, 0, 0);
radPassTileFootprint(pass2, 12 bytes per pixel, 0 pixel filter width);
// Pass 2 depends on pass0 and pass1
radPassDependencies(pass2, 2, {pass0, pass1});
// Allow multipass tiling with pass0,pass1
radPassTilingBoundary(FALSE);
// Current pass cannot launch fragment work until earlier rendertarget
writes complete
    radPassBarrier(pass2,
        /*srcMask*/RAD_RENDERTARGET_STAGE_BIT,
        /*dstMask*/RAD_FRAGMENT_STAGE_BIT,
        /*flushMask*/RAD_RENDERTARGET_ACCESS_BIT,
        /*invalidateMask*/RAD_TEXTURE_ACCESS_BIT);
// Discard the transient color0/1 at the end of this pass
radPassDiscard(pass2, color0, 0);
radPassDiscard(pass2, color1, 0);
radCompilePass(pass2);
```

Complex multipass with offset and discard:

```
pass0 = radCreatePass(device);
radPassRendertargets(pass0, 1, &color0, 0, 0);
// 8 bytes per pixel (4 in color0, 4 in color1)
radPassTileFootprint(pass0, 8 bytes per pixel, 2 pixel max filter
width);
radCompilePass(pass0);
// submit work to pass0
pass1 = radCreatePass(device);
radPassRendertargets(pass1, 1, &color1, 0, 0);
radPassTileFootprint(pass1, 8 bytes per pixel, 2 pixel filter width);
// Texture coords are within +/- 2x2 pixels of window position
radPassTileFilterWidth(pass1, {2,2} pixels);
// Tile across the incoming dependencies (pass 0)
radPassTilingBoundary(FALSE);
radPassDependencies(pass1, 1, &pass0);
// Current pass cannot launch fragment work until earlier rendertarget
writes complete
    radPassBarrier(pass1,
        /*srcMask*/RAD_RENDERTARGET_STAGE_BIT,
        /*dstMask*/RAD_FRAGMENT_STAGE_BIT,
        /*flushMask*/RAD_RENDERTARGET_ACCESS_BIT,
        /*invalidateMask*/RAD_TEXTURE_ACCESS_BIT);
// Discard the transient color0 at the end of this pass, with an offset
// that is double the filter width
radPassDiscard(pass1, color0, 4 pixels);
// Store color1 at the end of this pass
radPassStore(pass1, color1, 0 pixels);
radCompilePass(pass1);
```

Embodiments of the present technology advantageously specify dependencies for synchronization, cache control, memory tiling use case, and the like. Embodiments of the present technology are both simpler and more efficient for driver and application to implement and use.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computer system method comprising:
receiving descriptions of a plurality of passes comprising sets of passes;
for each set of passes, wherein a first pass of the set is a destination pass and a second pass of the set is a source pass respectively;
determining one or more dependencies of one or more dependency types between commands of the destination pass and the source pass;
creating pass objects that record the commands and the determined dependencies between the corresponding destination and source passes; and
submitting the commands for execution according to the corresponding pass objects.

2. The method according to claim 1, wherein the one or more dependency types comprise execution dependencies, cache dependencies, and tiling dependencies.

3. The method according to claim 2, wherein a tiling dependency is a Boolean value indicating whether there is a one-to-one pixel correspondence between source and destination passes.

4. The method according to claim 2, wherein a tiling dependency includes a Boolean value indicating whether there is an approximate one-to-one pixel correspondence between the source pass and the destination pass, and wherein there are a plurality of filter values indicating the size of a neighborhood of when there is not an approximate one-to-one pixel correspondence.

5. The method according to claim 2, wherein the one or more dependencies are specified by one or more of a source mask, a destination mask, a flush mask and an invalidation mask.

6. The method according to claim 5, wherein the source mask and destination mask indicate sets of stages of execution of a graphics pipeline or compute pipeline.

7. The method according to claim 5, wherein the flush mask indicates a memory access type to be flushed to a coherent memory.

8. The method according to claim 5, wherein the invalidate mask indicates a memory access type to have its cache lines invalidated.

9. The method according to claim 1, wherein each pass object includes information about inputs including one or more of dependencies, barriers and preserved buffers.

10. The method according to claim 1, wherein each pass object includes information about outputs including one or more of render targets, discarded buffers and resolved buffers.

11. The method according to claim 1, wherein one or more pass objects includes information about a tiling state, including 1:1 pixel mapping, filter width and memory footprint.

12. One or more non-transient computing device readable media storing computing device executable instructions that when executed by one or more processing units perform a method comprising:

receiving descriptions of passes comprising sets of passes;

for each set of passes, wherein a first pass of the set is a destination pass and a second pass of the set is a source pass respectively;

determining one or more dependencies of one or more dependency types between commands of the destination pass and the source pass;

creating pass objects that record the rendering commands and the determined dependencies between the corresponding destination and source passes; and submitting the rendering commands for execution according to the corresponding pass objects.

13. The method according to claim 12, wherein the one or more dependency types comprise execution dependencies, cache dependencies, and tiling dependencies.

14. The method according to claim 13, wherein a tiling dependency is a Boolean value indicating whether there is a one-to-one pixel correspondence between source and destination passes.

15. The method according to claim 13, a tiling dependency includes a Boolean value indicating whether there is an approximate one-to-one pixel correspondence between the source pass and the destination pass, and wherein there are a plurality of filter values indicating the size of a neighborhood of when there is not an approximate one-to-one pixel correspondence.

16. The method according to claim 12, wherein the one or more dependencies are specified by one or more of a source mask, a destination mask, a flush mask and an invalidation mask.

17. The method according to claim 16, wherein the flush mask indicates a memory access type to be flushed to a coherent memory.

18. The method according to claim 16, wherein the invalidate mask indicates a memory access type to have its cache lines invalidated.

19. The method according to claim 12, wherein each pass object includes information about inputs including one or more of dependencies, barriers and preserved buffers.

20. The method according to claim 12, wherein each pass object includes information about outputs including one or more of render targets, discarded buffers and resolved buffers.

21. The method according to claim 12, wherein one or more pass objects includes information about a tiling state, including 1:1 pixel mapping, filter width and memory footprint.

22. A method comprising:

receiving commands;

identifying a plurality of passes comprising set of passes for the received commands;

for each set of-passes, wherein a first pass of the set is a destination pass and a second pass of the set is a source pass respectively;

determining one or more dependencies of one or more dependency types between commands of the destination pass and the source pass;

creating pass objects for each identified pass, wherein each pass object records the commands and dependencies between the corresponding destination and source passes; and submitting the commands of the plurality of pass objects for execution according to the corresponding pass objects.

* * * * *